(12) United States Patent
Clark

(10) Patent No.: US 6,326,703 B1
(45) Date of Patent: Dec. 4, 2001

(54) POWER APPARATUS

(76) Inventor: John W. Clark, 721 E. Main St., Carmel, IN (US) 46032

( * ) Notice: Subject to any disclaimer, the term of this patent is extended or adjusted under 35 U.S.C. 154(b) by 0 days.

(21) Appl. No.: 09/516,515

(22) Filed: Mar. 1, 2000

(51) Int. Cl.[7] .............................. F01D 15/10; F02C 6/00; H02K 7/18; H02P 9/04

(52) U.S. Cl. .............................. 290/52; 290/42; 290/43; 290/51; 290/1 R; 290/2

(58) Field of Search ..................... 290/1 R, 2, 42–44, 290/52–54

(56) References Cited

U.S. PATENT DOCUMENTS

| | | | | |
|---|---|---|---|---|
| 4,201,635 | * | 5/1980 | Muller | 204/1 |
| 4,571,534 | * | 2/1986 | Cover | 322/2 R |
| 5,899,072 | * | 5/1999 | Gode | 60/670 |
| 6,155,212 | * | 12/2000 | McAlister | 123/3 |

* cited by examiner

*Primary Examiner*—Elvin Enad
(74) *Attorney, Agent, or Firm*—Jack Schuman

(57) ABSTRACT

Ethanol fuel is fed into hot burn chamber of twin turbine, initially to burn in the presence of compressed air. After turbine in hot burn chamber is started, water is electrolyzed by means of DC current produced by DC generator on turbine shaft, and resulting hydrogen and oxygen gases are pumped into hot burn chamber and are ignited by the burning ethanol fuel to produce products of combustion which continue to drive the turbine.

4 Claims, 1 Drawing Sheet

POWER APPARATUS

BACKGROUND OF THE INVENTION

1. Field of the Invention

This invention relates to a novel and efficient power apparatus to produce electricity. More particularly, this invention relates to a power apparatus employing a turbine operated on a mixture of ethanol and hydrogen and oxygen gases generated by electrolysis of water to produce electricity.

2. Description of the Prior Art

Power apparatus employing turbines to generate electricity are so well known as not to require citation here.

No such power apparatus employing turbines operated on a mixture of ethanol and hydrogen and oxygen gases produced as a result of electrolysis of water are known.

SUMMARY OF THE INVENTION

One of the objects of this invention is to provide an improved and efficient power apparatus by means of which an electric current can be generated.

Another of the objects of this invention is to provide power apparatus that is economical to operate and which efficiently generates electricity.

Other and further objects of this invention will become apparent by reference to the accompanying specification and drawing, and to the appended claims.

Briefly, I have discovered that the foregoing objects may be attained by providing an apparatus including a turbine run on a mixture of ethanol and hydrogen and oxygen gases produced by electrolysis of water to operate electrical generating equipment.

DESCRIPTION OF THE DRAWING

Referring now to the drawing.

DESCRIPTION OF THE PREFERRED EMBODIMENT

Figure 1:
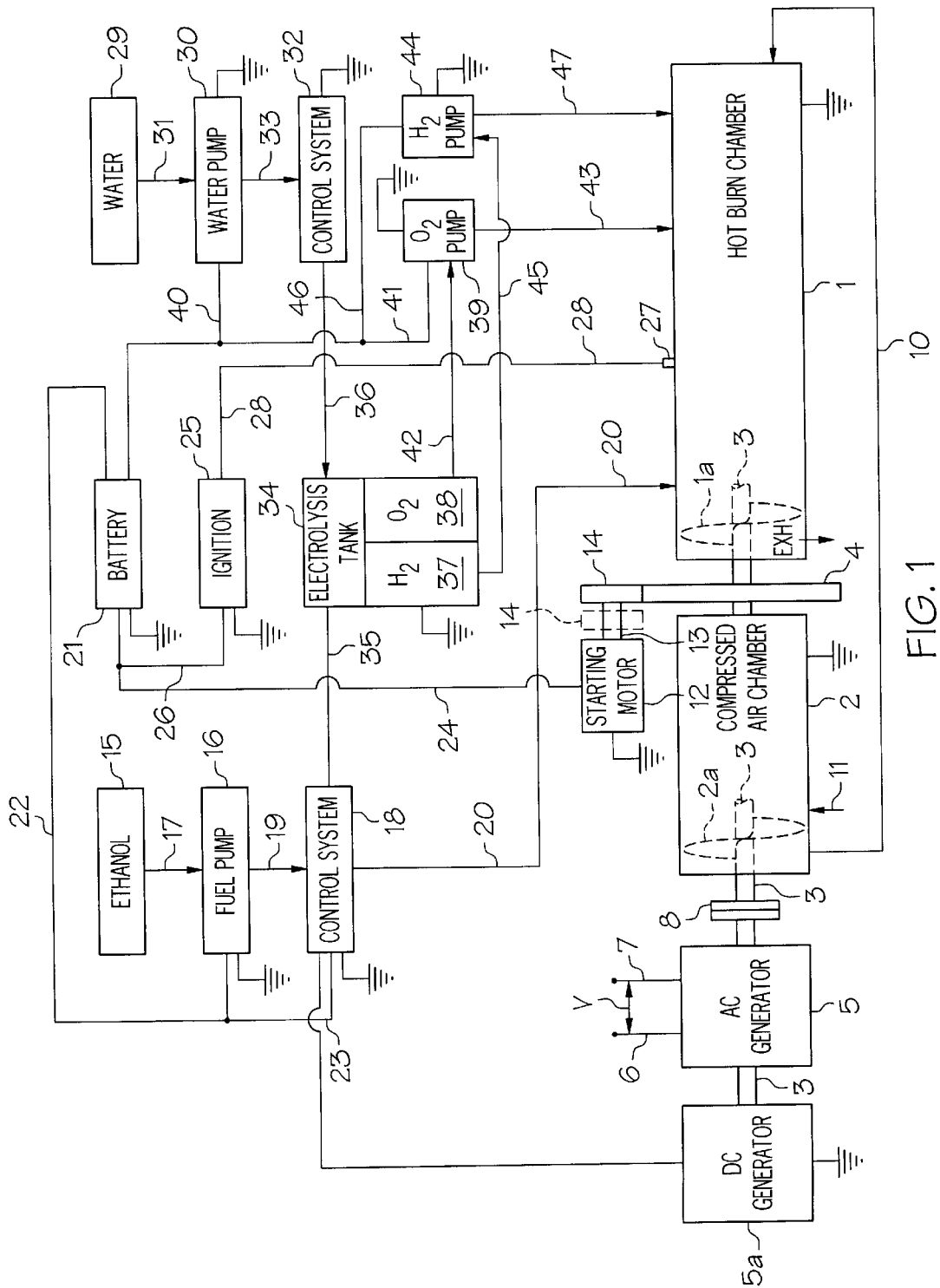
FIG. 1 represents diagrammatically the various components of the power apparatus, the power lines connecting and serving the various components, and conduits for conducting ethanol fuel and water to the various components during the course of operation.

A twin turbine is shown as comprising hot burn chamber 1 housing turbine 1a, and compressed air chamber 2 housing turbine 2a, connected by turbine shaft 3.

AC generator 5 is mounted to and is driven by turbine shaft 3. Leads 6 and 7 conduct electricity generated by AC generator 5 to wherever needed.

DC generator 5a is also mounted to and is driven by turbine shaft 3.

Electric clutch 8 is incorporated in turbine shaft 3 between compressed air chamber 2 and AC generator 5.

Conduit 10 conducts compressed air, after compression in said compressed air chamber 2 by turbine 2a therein, to hot burn chamber 1.

Conduit 11 conducts ambient air from the atmosphere into compressed air chamber 2 for compression therein.

Starting motor 12 is connected by shaft 13 to flywheel 14. As shown in solid lines in the drawing, flywheel 14 is engaged with flywheel 4 when the turbine shaft 3 is to be rotated to start turning turbine 1a in hot burn chamber 1. As shown in dotted lines in the same drawing, the flywheel 14 can be laterally withdrawn from engagement with flywheel 4, or is otherwise disengaged from flywheel 4 when hot burn chamber 1 has been started and is operating.

Tank 15 contains ethanol fuel. Fuel pump and injection system 16 receives ethanol fuel from tank 15 through conduit 17. Engine control system 18 receives ethanol fuel from fuel pump and injection system 16 through conduit 19.

Conduit 20 conducts ethanol fuel from engine control system 18 to hot burn chamber 1.

Battery 21 provides electrical power through line 22 to fuel pump and injection system 16, and through line 23 to engine control system 18. Battery 21 also provides electrical power through line 24 to starting motor 12.

Ignition system 25 is powered by battery 21 through line 26.

Igniter plug 27, mounted in hot burn chamber 1, is powered by ignition system 25 through line 28.

Tank 29 holds water which is conducted to water pump 30 through conduit 31.

Conduit 33 conducts water from water pump 30 to engine control system 32.

Electrolysis tank 34 receives water from engine control system 32 through conduit 36.

Electrolysis tank 34 receives D.C. current from engine control system 18 through line 35 and electrolyzes water to produce hydrogen gas which is held in hydrogen accumulator chamber 37, and oxygen gas which is held in oxygen accumulator chamber 38.

Battery 21 provides electrical power through line 40 to water pump 30, through line 41 to oxygen pump 39, and through line 46 to hydrogen pump 44.

Oxygen pump 39 receives oxygen from oxygen accumulator chamber 38 through conduit 42, and pumps oxygen to hot burn chamber 1 through conduit 43.

Hydrogen pump 44 receives hydrogen from hydrogen accumulator chamber 37 through conduit 45, and pumps hydrogen to hot burn chamber 1 through conduit 47.

Various ground connections, shown but not identified by numerals, are provided and are so well known in the electrical arts as not to require further description.

The operation of the power apparatus shown herein will now be described.

Ethanol fuel from tank 15 is conducted to fuel pump 16, thence to engine control system 18, and finally to hot burn chamber 1, which is fed compressed air through conduit 10. Battery 21 operates starting motor 12 and, with flywheel 14 engaged, as shown in solid lines, with flywheel 4, turns over turbine shaft 3 which operates hot burn chamber 1 and compressed air chamber 2 by turning over turbines 1a and 2a therein. Battery 21 supplies power to ignition system 25 which feeds power to igniter plug 27 in hot burn chamber 1. In this manner, the ethanol fuel is ignited, initially burning with compressed air in said hot burn chamber 1, and starts hot burn chamber 1 operating by rotating turbine 1a therein. Water from tank 29 is then fed by water pump 30 to engine control system 32 and thence to electrolysis tank 34.

DC generator 5a, mounted to turbine shaft 3, is caused to rotate and thus feeds an electrical current through engine control system 18 to electrolysis tank 34 which, under the influence of the DC current, decomposes water into hydrogen gas and oxygen gas. These gases are introduced by means of pumps 39 and 44 into hot burn chamber 1. The ethanol flame causes the hydrogen gas to burn in the oxygen gas, such highly efficient combustion of the hydrogen gas in the oxygen gas generating gaseous products of combustion which operate turbine 1a in hot combustion chamber 1. It will be apparent that the rate of introduction of ethanol fuel and hydrogen and oxygen gases into hot burn chamber 1 can be regulated and controlled by engine control systems 18 and 32, to result in the desired level of power produced by hot burn chamber 1 and thus to control the level of electrical output of generator 5. It will also be apparent that, with the combusting of hydrogen gas in oxygen gas in hot burn chamber 1, the rate of feed of ethanol fuel can be reduced over that initially required to start the operation.

As previously noted, AC generator 5 is operated by turbine shaft 3 to produce AC current which is conducted through leads 6 and 7 to the location requiring such electrical current.

Because modifications and changes which do not depart from the spirit of the invention as disclosed herein may occur to those skilled in the art to which this invention pertains, the appended claims should be construed as covering modifications and equivalents suitable to the practice of the invention.

I claim:

1. Apparatus to generate electricity, said apparatus comprising:
    (a) a hot burn chamber,
    (b) a turbine in said hot burn chamber,
    (c) a turbine shaft connected to said turbine in said hot burn chamber,
    (d) an AC generator mounted to said turbine shaft to generate an AC electrical current for use elsewhere,
    (e) a DC generator mounted to said turbine shaft to generate a DC electrical current,
    (f) a supply of ethanol fuel,
    (g) first conduit means to convey said ethanol fuel to said hot burn chamber,
    (h) a supply of water,
    (i) an electrolysis tank,
    (j) second conduit means to convey said water to said electrolysis tank,
    (k) means to conduct DC current generated by said DC generator to said electrolysis tank thereby to electrolyze water therein to produce hydrogen gas and oxygen gas,
    (l) second means to pump said hydrogen gas to said hot burn chamber,
    (m) third means to pump said oxygen gas to said hot burn chamber,
    (n) whereby ethanol fuel and hydrogen are combusted in said hot burn chamber in the presence of said oxygen, thereby to drive the turbine in said hot burn chamber and to turn said turbine shaft, and thereby operate said AC generator and said DC generator.

2. Apparatus as in claim 1, further comprising:
    (o) engine control system to control the rate of feed of fuels into said hot burn chamber.

3. Apparatus as in claim 1 further comprising:
    (o) a compressed air chamber,
    (p) a turbine in said compressed air chamber,
    (q) third conduit means to conduct ambient air from the atmosphere into said compressed air chamber,
    (r) fourth conduit means to conduct compressed air produced by the turbine in said compressed air chamber into said hot burn chamber.

4. Apparatus as in claim 1, further comprising:
    (o) an ignition system,
    (p) a battery,
    (q) fourth means to conduct DC current from said battery to said ignition system,
    (r) an igniter plug in said hot burn chamber,
    (s) fifth means to conduct a current from said ignition system to said igniter plug, thereby to start the combustion of ethanol fuel in said hot burn chamber, whereby the combustion of ethanol fuel ignites the combustion of hydrogen gas in said oxygen gas in said hot burn chamber.

* * * * *